United States Patent
Tsuruta et al.

(10) Patent No.: US 8,539,740 B2
(45) Date of Patent: Sep. 24, 2013

(54) FILLING AND PACKAGING MACHINE AND PROCESS FOR PRODUCING PACKAGE

(75) Inventors: Orihiro Tsuruta, Takasaki (JP); Shunji Yamada, Takasaki (JP)

(73) Assignee: Orihiro Engineering Co., Ltd. (JP)

( * ) Notice: Subject to any disclaimer, the term of this patent is extended or adjusted under 35 U.S.C. 154(b) by 16 days.

(21) Appl. No.: 12/522,900

(22) PCT Filed: Jan. 16, 2007

(86) PCT No.: PCT/JP2007/050509
§ 371 (c)(1),
(2), (4) Date: Jul. 10, 2009

(87) PCT Pub. No.: WO2008/087710
PCT Pub. Date: Jul. 24, 2008

(65) Prior Publication Data
US 2010/0043358 A1 Feb. 25, 2010

(51) Int. Cl.
*B65B 9/00* (2006.01)
(52) U.S. Cl.
USPC .......................................... 53/451; 53/375.3
(58) Field of Classification Search
USPC ............................. 53/450, 451, 375.3, 389.3
See application file for complete search history.

(56) References Cited

U.S. PATENT DOCUMENTS

| | | | |
|---|---|---|---|
| 3,703,796 A * | 11/1972 | Inoue et al. ...................... 53/121 |
| 4,656,818 A * | 4/1987 | Shimoyama et al. ............ 53/551 |
| 5,463,851 A | 11/1995 | Nagai |
| 6,212,861 B1 * | 4/2001 | Tsuruta ............................ 53/551 |
| 6,219,998 B1 * | 4/2001 | Demming et al. ............... 53/459 |
| 6,691,491 B2 * | 2/2004 | Terminella et al. ........... 53/133.4 |
| 7,299,604 B2 * | 11/2007 | Kammler et al. ............... 53/451 |
| 7,546,722 B2 | 6/2009 | Tsuruta |
| 2007/0011992 A1 * | 1/2007 | Hefner et al. .................... 53/451 |
| 2007/0084142 A1 * | 4/2007 | Matthews ........................ 53/412 |
| 2010/0101189 A1 * | 4/2010 | Boldrini .......................... 53/451 |

FOREIGN PATENT DOCUMENTS

| JP | A-S57-37510 | 3/1982 |
|---|---|---|
| JP | U-S58-14303 | 1/1983 |

(Continued)

OTHER PUBLICATIONS

International Preliminary Report on Patentability for PCT/JP2007/050509, Filing Date Jan. 16, 2007.

(Continued)

*Primary Examiner* — Alexandra Elve
*Assistant Examiner* — Eyamindae Jallow
(74) *Attorney, Agent, or Firm* — Knobbe Martens Olson & Bear LLP

(57) ABSTRACT

Filling and packaging machine (10) includes supply pipe (13) for supplying contents into film (10), squeeze rollers (16) for feeding film (1) downward and horizontal seal mechanism (100) for sealing in the contents supplied into film (1). Horizontal seal mechanism (11) includes heating unit (120) having a pair of seal bars for heat-sealing film (1) and cooling/cutting unit (140), placed under the cooling/cutting unit, having a pair of cooling bars for cooling a heat-sealed portion of film 1. Cooling/cutting unit (140) is movable in a vertical direction so that the cooling bars can be positioned between the seal bars while the seal bars are opened.

8 Claims, 11 Drawing Sheets

(56) References Cited

FOREIGN PATENT DOCUMENTS

| | | | |
|---|---|---|---|
| JP | U-S5814303 A * | 1/1983 | |
| JP | B-2598879 | 7/1995 | |
| JP | B-2598879 | 4/1997 | |
| JP | 2001122209 A * | 5/2001 | |
| JP | A-2001-122209 | 5/2001 | |
| JP | A-2004-276930 | 3/2003 | |
| JP | 2004276930 A * | 10/2004 | |
| JP | A-2004-276930 | 10/2004 | |
| JP | 2006-298390 | 11/2006 | |
| WO | WO2005-105578 | 11/2005 | |

OTHER PUBLICATIONS

Chinese Office Action dated Feb. 21, 2011 for the counterpart Chinese Application No. 200780050746.1.
Korean Office Action dated May 20, 2011 for the counterpart Korean Application No. 10-2009-7016118.
Office Action dated Oct. 12, 2011 in Corresponding Japanese Patent Application No. 2008-553912.
Date-stamped (Aug. 22, 2012) extended European Search Report issued in corresponding European Patent Application No. 07706836.9, dated Aug. 16, 2012.

* cited by examiner

FILLING AND PACKAGING MACHINE AND PROCESS FOR PRODUCING PACKAGE

This application is the U.S. National Phase under 35 U.S.C. 371 of International Application PCT/JP2007/050509, filed Jan. 16, 2007. The International Application was published under PCT Article 21(2) in a language other than English.

TECHNICAL FIELD

The present invention relates to a vertical-type filling and packaging machine which successively produces packages including contents in the form of a liquid or a paste having no specific shape held within film, and to a method of producing packages of this type.

BACKGROUND ART

Vertical-type filling and packaging machines are known which produce packages including contents in the form of a liquid or a paste having no specific shape held therein.

Such a vertical-type filling and packaging machine successively produces packages by forming a long length of sheet film such that both edges thereof in a width direction coincide and feeding the film downward. The vertical-type filling and packaging machine has a vertical seal mechanism which heat-seals the edges of the formed film along a longitudinal direction of the film to shape the film into a tubular shape, a supply pipe for supplying contents into the tubular shaped film, and a horizontal seal mechanism which heat-seals the film throughout the width thereof in order to seal in the contents supplied in the film.

The horizontal seal mechanism has a pair of seal bars moved toward or away from each other and placed opposite to each other across a path through which the film passes. The paired bars sandwich the film, and heats and pressurizes the film to heat-seal the film in the width direction.

The horizontal seal mechanism also has a pair of cooling bars placed opposite to each other across the path through which the tubular film passes. Similarly to the seal bars, the cooling bars are moved toward or away from each other and sandwich and pressurize the film to promote cooling of the portion of the film that was heated by the seal bars. One of the paired cooling bars is provided with a cutter which is moved toward or away from the other cooling bar. While the cooling bars are closed, the cutter is moved forward to cut the portion of the film that is sandwiched by the cooling bars along the width direction.

In conventional vertical-type filling and packaging machines, improved quality of produced packages is sought by refining the arrangement, the operation and the like of the components of the horizontal seal mechanism such as the seal bars and the cooling bars.

For example, Japanese Patent No. 2598879 (Patent Document 1) has disclosed a filling and packaging machine which includes a cooling bar incorporated in each of a pair of seal bars. Specifically, each of the seal bars movable toward or away from each other is provided for each of a pair of support members placed opposite to each other across a path through which film passes. The cooling bar is provided for each of the support members such that the cooling bars are positioned apart when the seal bars are placed at a forward pressurization position, and as the seal bars are moved backward, the cooling bars are moved toward the position where they perform pressurization at the same position as the pressurization position of the seal bars. One of the two cooling bars is provided with a cutter for cutting the film in a width direction.

During a process of sealing contents by the horizontal seal mechanism, the feeding of the film and the supplying of the contents are temporarily stopped. In this state, the seal bars are moved forward to heat and pressurize the film to perform heat sealing in the width direction. The seal bars are then moved backward. This causes the cooling bars to move and pressurize the heat-sealed portion of the film. The heat-sealed portion of the film is cooled by the cooling bars and solidified, and cut by the cutter in the width direction. After the cooling and the cutting of the tubular film by the cooling bars, the seal bars are moved forward to an intermediate position to release the film from the cooling bars. The abovementioned operations result in a package including the contents therein. Then, the downward feeding of the film and the supplying of the contents are restarted, and the series of operations described above is repeated.

International Publication WO 2005/105578 (Patent Document 2) has disclosed a filling and packaging machine in which a pair of seal bars and a pair of cooling bars are attached to a support member which is movable upward and downward. The pair of seal bars are placed opposite to be movable toward or away from each other. The pair of cooling bars are placed opposite to be movable toward or away from each other under the seal bars. One of the cooling bars is provided with a cutter for cutting a film in a width direction.

In the filling and packaging machine disclosed in Patent Document 2, for sealing in contents by a horizontal seal mechanism, the seal bars are driven to heat-seal the film in the width direction while the feeding of the film and the supplying of the contents are temporarily stopped. The seal bars are then moved backward and the support member is moved upward. The upward movement of the support member causes the pair of cooling bars to be placed at the same level as that of the heat-sealed portion of the film. After the upward movement of the support member, the cooling bars are closed to solidify the heat-sealed portion of the film and to cut the tubular film in the width direction. Then, the cooling bars are opened to provide a package including the contents therein. Thereafter, the support member is moved downward, the downward feeding of the film and the supplying of the contents are restarted, and the abovementioned series of operations is repeated.

As described above, the filling and packaging machine described in Patent Document 1 has the structure in which the cooling bars are incorporated into the seal bars, so that the heat-sealed position of the film is hardly displaced from the cutting position thereof. Such a horizontal seal mechanism, however, has a complicated structure which limits the usable shapes in the seal bars and the cooling bars to some extent. In production of packages, the seal bars and the cooling bars may need to be changed depending on the shape and the size of the packages to be produced or the material of the film. If the usable shapes of the seal bars and the cooling bars are limited, a wide variety of packages cannot be produced.

In the filling and packaging machine described in Patent Document 2, since the seal bars and the cooling bars are driven independently, it is easy to form the bars to be replaceable individually and thus a wide variety of packages can be produced. In the filling and packaging machine described in Patent Document 2, however, the feeding of the film and the supplying of the contents are stopped from the start of the heat sealing of the film to the opening of the cooling bars, that is, during the operation of the horizontal seal mechanism, as is the case with the filling and packaging machine described in Patent Document 1. To improve the manufacture efficiency of packages, it is advantageous to minimize the time period in which the feeding of the film is stopped.

Some of the vertical-type filling and packaging machines have a pair of film holders which are placed above seal bars to sandwich a film throughout the width thereof in order to perform heat sealing more stably by a horizontal seal mechanism. In the filling and packaging machine described in Patent Document 2, however, the whole horizontal seal mechanism including the seal bars and the cooling bars is moved upward in cooling the film. Even when the film holders are provided for the horizontal seal mechanism, the film holders cannot be functioned effectively since the film holders need to be opened in the upward movement of the horizontal seal mechanism. It is also contemplated that the film holders can be provided as a unit independent of the horizontal seal mechanism and be placed above the horizontal seal mechanism. In this case, however, the film holders need to be placed at a level determined by taking account of the upward moving distance of the horizontal seal mechanism, leading to an increase in the height of the filling and packaging machine.

DISCLOSURE OF THE INVENTION

It is a first object of the present invention to provide a vertical-type filling and packaging machine which can produce packages efficiently by minimizing the time period in which feeding of a film is stopped, and a method of producing packages.

It is a second object of the present invention to allow heat sealing to be performed more stably by a horizontal seal mechanism in addition to the abovementioned first object.

A filling and packaging machine according to the present invention produces a package including contents held in a film while feeding the film from upward to downward, including a supply pipe for supplying contents into the film formed in a tubular shape, a film feed mechanism feeding the film from upward to downward, and a horizontal seal mechanism placed below the supply pipe in order to seal in contents supplied into the film. The horizontal seal mechanism includes a pair of seal bars and a pair of cooling bars. The seal bars are adapted to be movable in the opposite direction to pressurize the film from sides in order to heat-seal the film formed in the tubular shape. The cooling bars are adapted to be movable in the opposite direction to pressurize the film from the sides and to be movable in a vertical direction to be capable of being positioned between the seal bars while the seal bars are opened, in order to cool the portion of the film heat-sealed by the seal bars.

Since the cooling bars are adapted to be movable in the vertical direction in this manner, the cooling bars can cool and solidify the portion of the film heat-sealed by the seal bars while the film is fed downward. This can reduce the time period in which the feeding of the film is stopped as compared with the conventional example. In addition, the seal bars do not need to be moved in the vertical direction during the operation of the filling and packaging machine, so that it is possible to shorten the time period for switching from the cooling bars to the seal bars in the transition to the next heat-sealing step subsequent to the completion of the cooling operation of the film.

In the filling and packaging machine of the present invention, the seal bars do not need to be moved in the vertical direction as described above. Thus, when each of the cooling bars is supported by an upper portion of a support member placed below the seal bars and extended in the vertical direction to be movable in a direction in which the support members are opposite to each other and in the vertical direction, a pair of film holders opening or closing to sandwich the film from the sides can be placed between the supply pipe and the seal bars. The film holders can control dropping of the contents below the film holders. When the film is heat-sealed by the seal bars with the film holders closed, the heat sealing of the film can be performed more stably without being affected by the contents. Since the heat sealing of the film can be performed without being affected by the contents, the contents can be supplied even during the heat sealing of the film, thereby improving the manufacture efficiency of the package.

A method of producing a package according to the present invention produces a package including contents held in a film while feeding the film from upward to downward, including the steps of supplying contents into the film formed in a tubular shape, heat-sealing the film holding the supplied contents therein in a width direction thereof, sandwiching a heat-sealed portion of the film from sides of the film by means of a pair of cooling bars, and sealing in the contents supplied into the film. The feeding of the film is stopped in the step of heat-sealing the film and the step of sandwiching the film by the cooling bars. On the other hand, the step of sealing in the contents is performed while the film is fed downward. In the step of sealing in the contents, the cooling bars sandwiching the film are moved downward at the same speed as the feeding speed of the film and the heat-sealed portion of the film is solidified to seal in the contents.

As described above, in the method of producing a package according to the present invention, the cooling bars sandwiching the film are moved downward at the same speed as the feeding speed of the film while the film is fed downward. Since the heat-sealed portion of the film is cooled while the film is moved downward, the time period in which the feeding of the film is stopped is reduced as compared with the conventional example.

As described above, according to the present invention, the heat-sealed film can be cooled during the feeding of the film to reduce the time period in which the feeding of the film is stopped, thereby enabling efficient manufacture of the packages. Since the seal bars for heat-sealing the film do not need to be moved vertically, the film holders can be placed above the seal bars. As a result, the contents can be supplied continuously during the heat-sealing operation of the film by the seal bars to improve the manufacture efficiency of the package.

DESCRIPTION OF REFERENCE NUMERALS

1 FILM
10 FILLING AND PACKAGING MACHINE
13 SUPPLY PIPE
16 SQUEEZE ROLLERS
100 HORIZONTAL SEAL MECHANISM
120 HEATING UNIT
140 COOLING/CUTTING UNIT
125a, 125b SEAL BARS
128 FILM HOLDERS
146 FIRST COOLING BAR
153 SECOND COOLING BAR
150 CUTTING BLADE

BEST MODE FOR CARRYING THE INVENTION

Figure 1:
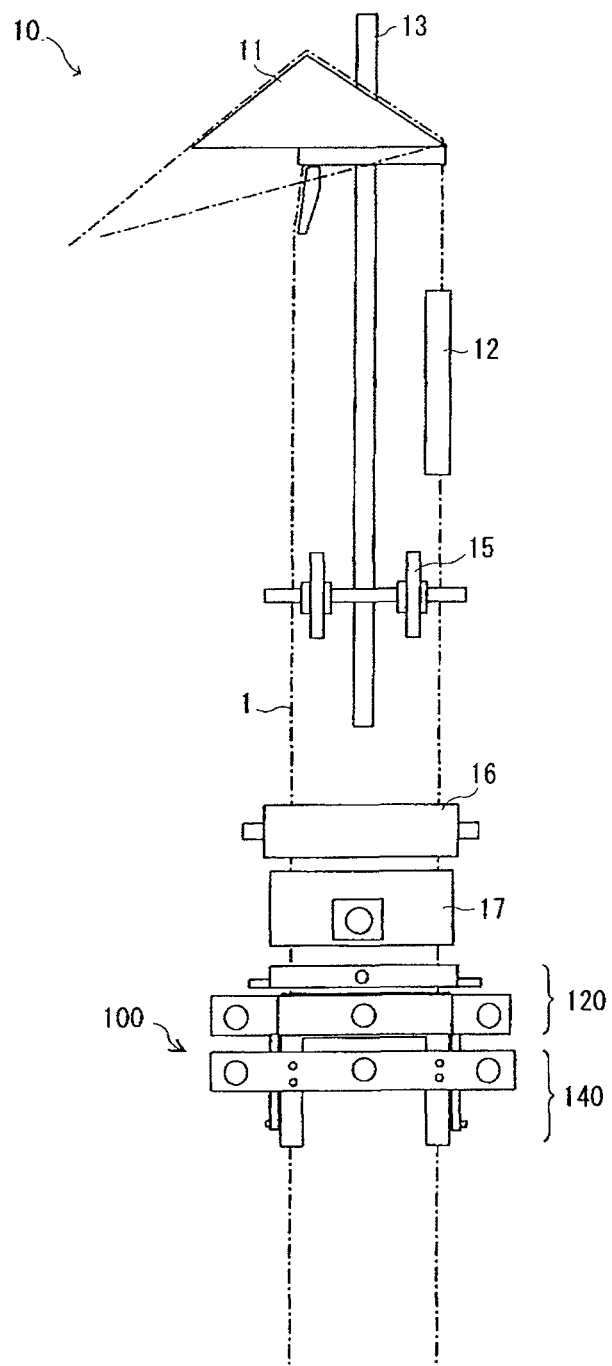
FIG. 1 is a front view showing a filling and packaging machine according to an embodiment of the present invention.
Figure 2:
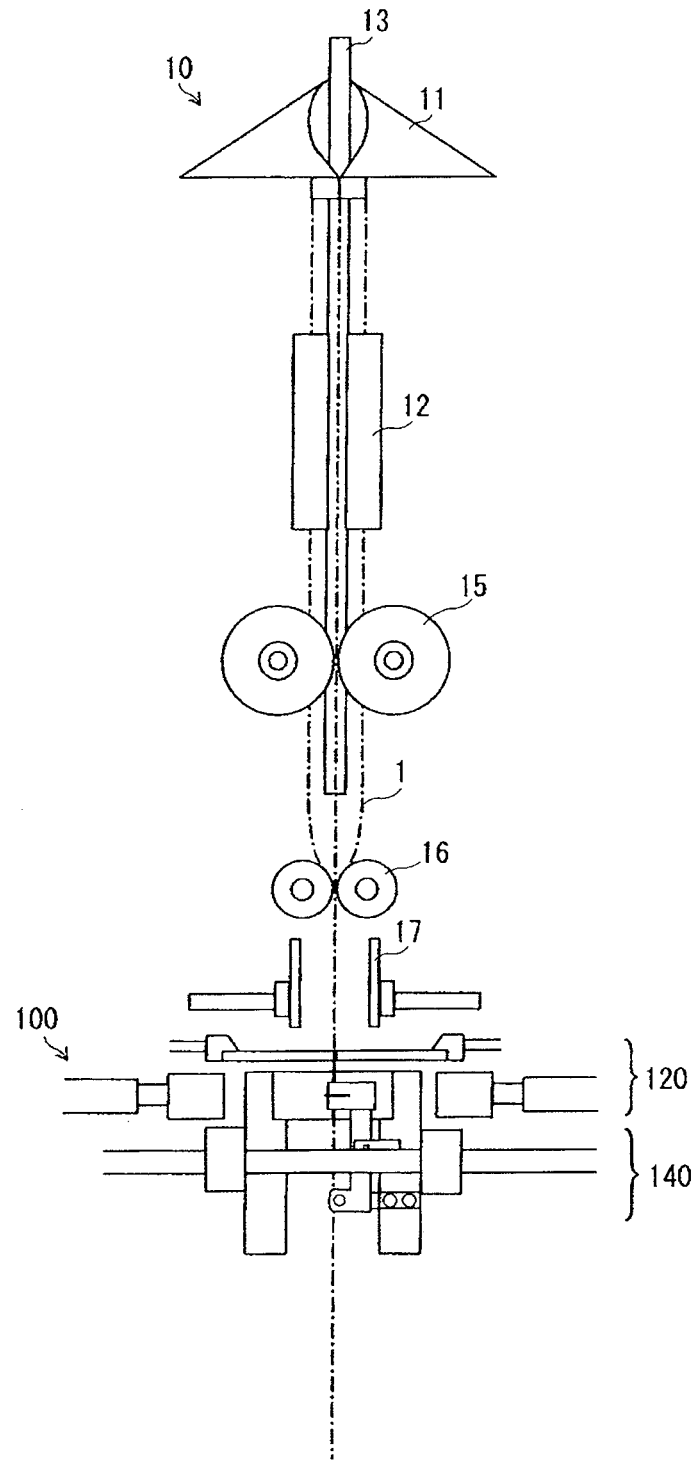
FIG. 2 is a side view showing the filling and packaging machine shown in FIG. 1.

Referring to FIGS. 1 and 2, filling and packaging machine 10 according to an embodiment of the present invention is shown which has bag forming guide 11, vertical seal mechanism 12, supply pipe 13, a pair of squeeze rollers 16, and horizontal seal mechanism 100. In FIGS. 1 and 2, driving portions of vertical seal mechanism 12, squeeze rollers 16, horizontal seal mechanism 100 and the like are omitted for simplifying the drawings.

Bag forming guide 11 forms a long length of film 1 of sheet shape fed out of a roll (not shown) by folding film 1 in half along its longitudinal direction to align both edges thereof while guiding film 11 downward. Auxiliary feed roller 15 is placed under bag forming guide 11 to assist the feeding of film 1 from upward to downward.

Vertical seal mechanism 12 is placed between bag forming guide 11 and auxiliary feed roller 15. Vertical seal mechanism 12 has a pair of vertical seal bars disposed opposite to each other across a path through which the aligned edges of film 1 formed by bag forming guide 11 pass. At least one of the paired vertical seal bars contains heating means (not shown) such as an electric heater. The vertical seal bars are driven to pressurize and heat the opposite edges of film 1 intermittently at regular time intervals in synchronization with the feeding of film 1. Thus, the edges of formed film 1 are heat-sealed throughout the longitudinal direction of film 1, and film 1 is shaped into a tubular shape. The portion of film 1 that is heat-sealed by vertical seal mechanism 12 is referred to as a vertical seal portion.

Supply pipe 13 supplies contents, and specifically, contents in the form of a liquid or a paste having no particular shape, into film 1 shaped in the tubular shape through the heat sealing by vertical seal mechanism 12. For this purpose, supply pipe 13 extends from above bag forming guide 11 into film 1 formed by bag forming guide 11, and the bottom end of supply pipe 13 is positioned below vertical seal mechanism 12.

Squeeze rollers 16 are placed opposite to each other with the passage path of film 1 interposed therebetween under the bottom end of supply pipe 13. Squeeze rollers 16 are provided to rotate in a direction for feeding film 1 downward and to be movable opposite such that rollers 16 are opened or closed. Squeeze rollers 16 have such a length as to pressurize film 1 throughout the width thereof when rollers 16 are closed.

While the contents are supplied at a level above squeeze rollers 16, squeeze rollers 16 are closed. The pressurization force of squeeze rollers 16 squeezes film 1 to separate the contents into two portions above and below rollers 16. While squeeze rollers 16 are held closed, they are rotated. The contents above squeeze rollers 16 remain above squeeze rollers 16, and only the contents below squeeze rollers 16 are fed together with film 1.

Horizontal seal mechanism 100 is placed under squeeze rollers 16 and heat-seals film 1 along the width direction throughout the width. Horizontal seal mechanism 100 is driven intermittently at regular time intervals in synchronization with the feeding of film 1 to form horizontal seal portions throughout the width of film 1 at regular space intervals in the longitudinal direction of film 1. As a result, the contents supplied into film 1 are sealed in.

The section of film 1 that is defined by two vertically adjacent horizontal seal portions represents a single package unit. Horizontal seal mechanism 100 also includes a component for cutting film 1 along the width direction. Film 1 is cut by the component for each of horizontal seal portions to provide packages separated in the individual package units.

A pair of shaping plates 17 are placed between squeeze rollers 16 and horizontal seal mechanism 100 such that plates 17 are movable toward and away from each other and opposite to each other across film 1. Shaping plates 17 sandwich the portion of film 1 filled with the contents at a predetermined opposite interval from the sides of filling and packaging machine 10 to prevent a bulge of film 1, thereby smoothing the shape of the portion of film 1 that holds the contents. This can prevent variations in the volume of the contents. If the prevention of a bulge of film 1 is not particularly required such as when the contents are lightweight and when stringent demands are not present on the volume of the contents, shaping plates 17 are not necessarily provided.

Horizontal seal mechanism 100 will hereinafter be described in more detail.

Horizontal seal mechanism 100 has heating unit 120 which heats film 1 to heat-seal the inner opposite surfaces of film 1, and cooling/cutting unit 140 which cools and solidifies the heat-sealed portion of film 1 and cuts film 1 in the width direction at the heat-sealed portion of film 1.

Figure 3:
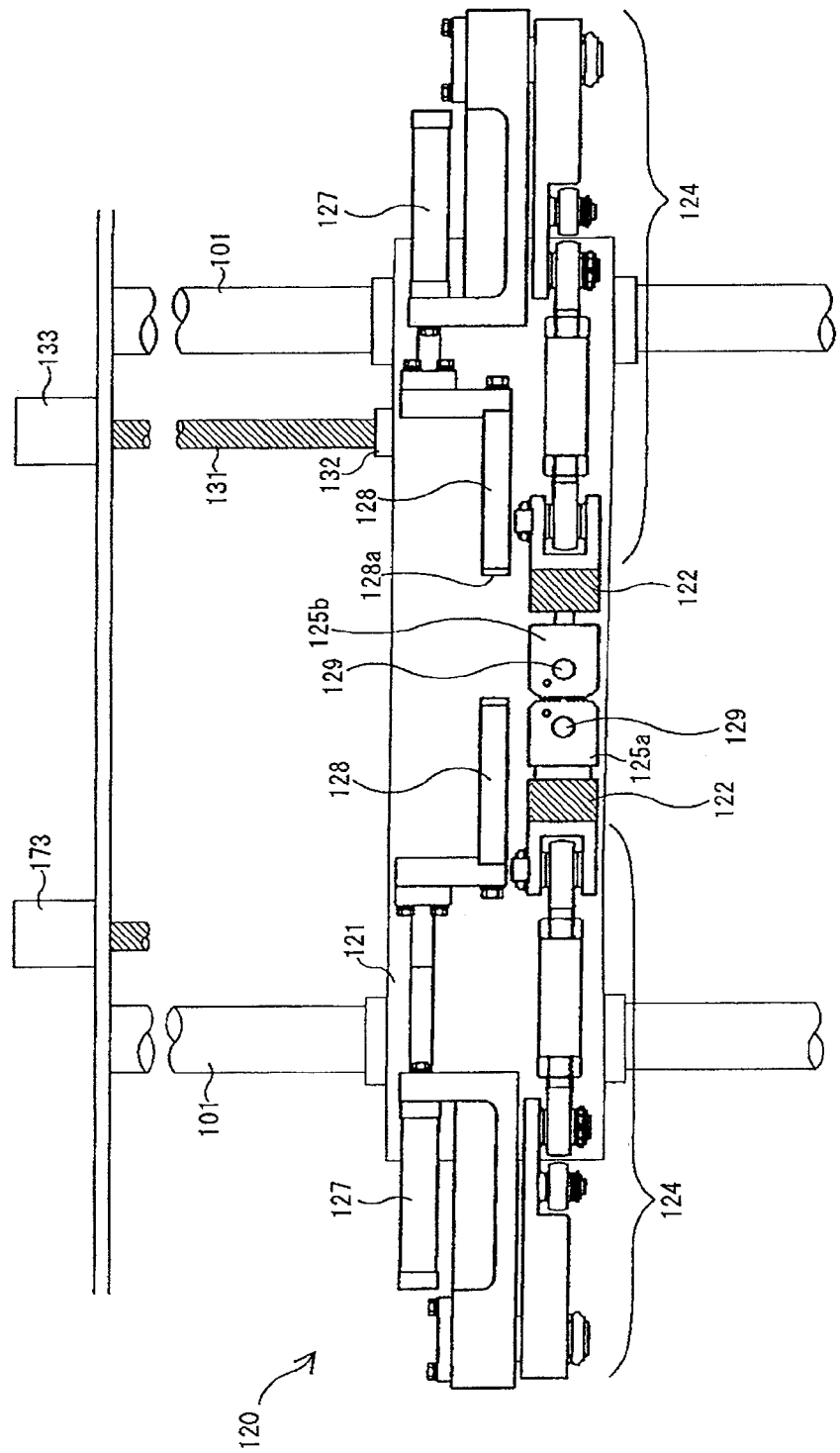
FIG. 3 is a side view showing, in section, a portion of a heating unit of a horizontal seal mechanism shown in FIG. 1.
Figure 4:
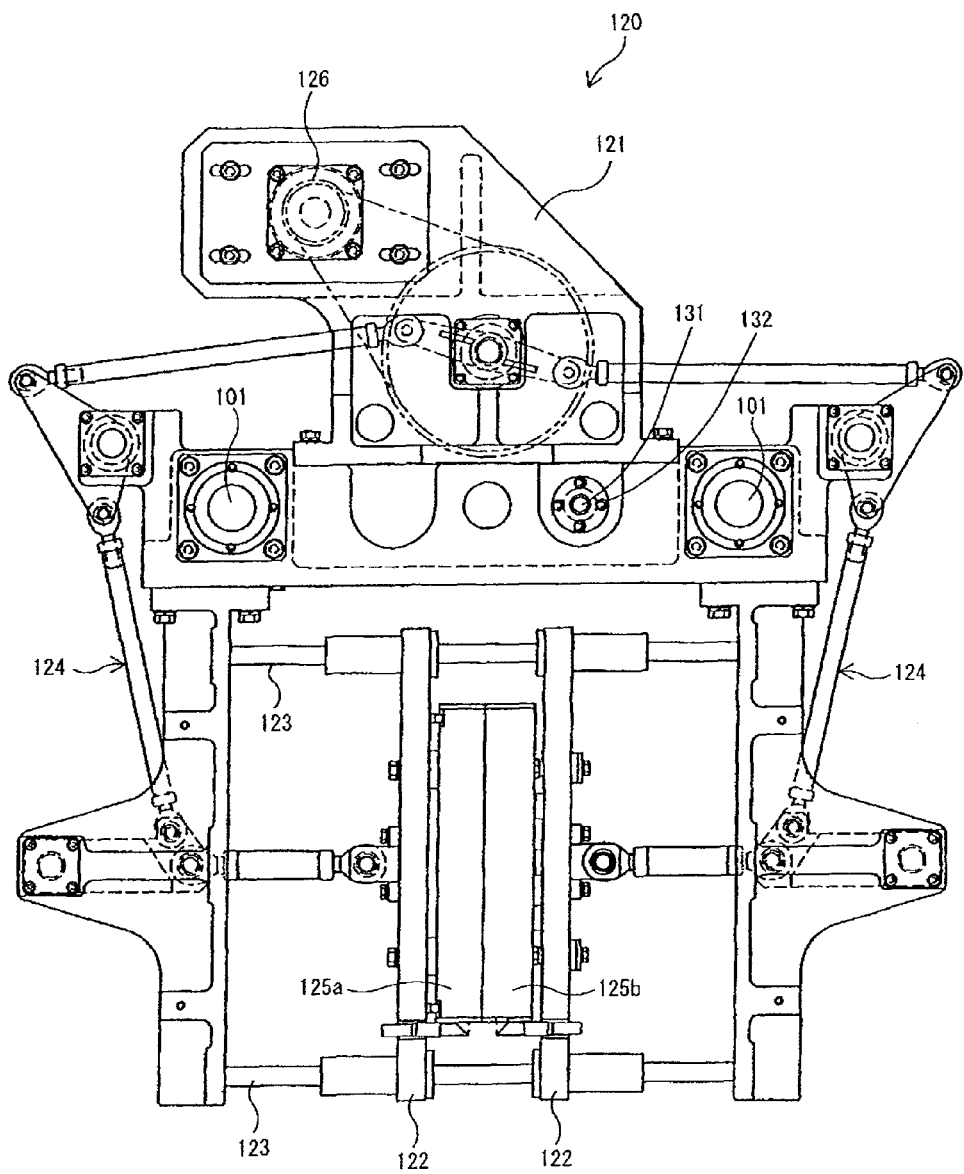
FIG. 4 is a plan view showing the heating unit shown in FIG. 3 except for film holders and a driving portion thereof.

First, heating unit 120 will be described with reference to FIGS. 3 and 4.

Heating unit 120 has frame structure 121 which serves as a base for supporting components included in heating unit 120. Frame structure 121 may be formed of a single member or may be formed of a combination of a plurality of members.

Two guide shafts 123 are supported by frame structure 121 at some space interval therebetween in the horizontal direction and in parallel to the direction in which squeeze rollers 16 (see FIG. 1) sandwich the film. Two sliders 122 placed opposite to each other are supported by guide shafts 123 to be movable along guide shafts 123. Each of sliders 122 is coupled to toggle link mechanism 124 which is operated by servomotor 126. Thus, two sliders 122 are moved opposite toward and away from each other.

Toggle link mechanism 124 is shown as the mechanism for moving sliders 122. However, it is possible to use an arbitrary mechanism instead which can reciprocate sliders 122 such as a fluid-pressure cylinder including an air cylinder and a hydraulic cylinder, a rack-and-pinion mechanism, and a linear actuator.

Seal bars 125a and 125b are attached to sliders 122. Seal bars 125a and 125b are placed at opposite positions in the horizontal direction and have opposite surfaces facing each other. As sliders 122 are moved, seal bars 125a and 125b are moved to pressurize film 1 with the opposite surfaces from the sides or are moved away from film 1.

Seal bars 125a and 125b have such a length as to pressurize film 1 throughout the width thereof and extend in the width direction of film 1 (see FIG. 1) fed below supply pipe 13 (see FIG. 1). Seal bars 125a and 125b contain heating means such as electric heaters 129. When seal bars 125a and 125b are closed during the operation of electric heaters 129 and in the presence of film 1 between two seal bars 125a and 125b, film 1 is pressurized and heated by seal bars 125a and 125b. This causes the pressurized and heated portion of film 1 to be heat-sealed. The heating means may be provided for only one of two seal bars 125a and 125b.

One seal bar 125b of two seal bars 125a and 125b is supported to be movable over a predetermined distance parallel to the moving direction of sliders 122 relative to sliders 122. A coil spring is provided between seal bar 125b and associated slider 122 to urge seal bar 125b toward the other seal bar 125a to receive the compression force from the pressing of both seal bars 125a and 125b. The spring constant of the coil spring can be appropriately set to specify the pressurization force applied to film 1 in a range proper for heat sealing.

Two film holder driving cylinders 127 are fixed to frame structure 121. Film holders 128 are attached to rods of film holder driving cylinders 127, respectively, above seal bars 125a and 125b and below squeeze rollers 16. Film holder driving cylinders 127 are placed opposite to each other such that the moving direction of the rods is parallel to the moving direction of seal bars 125a and 125b. Accordingly, film holders 128 are placed opposite to each other to sandwich film 1 from the sides thereof.

Film holders 128 are members of plate shape which have such a length as to pressurize film 1 throughout the width thereof fed below supply pipe 13 and extend in the length direction of seal bars 125a and 125b. As the rods of film holder driving cylinders 127 are moved forward, film holders 128 are opened or closed to sandwich film 1 throughout the width thereof. Cushioning member 128a made of a flexible material such as a silicone resin is affixed to each of the opposite surfaces of film holders 128 to prevent damage to film 1 when film 1 is sandwiched.

During the operation of filling and packaging machine 10 (see FIG. 1), heating unit 120 is not moved in the vertical direction, that is, in the feeding direction of film 1 below supply pipe 13. Thus, frame structure 121 may be fixed to the frame of entire filling and packaging machine 10.

In some cases, the distance from squeeze rollers 16 is changed depending on the size of packages to be produced. To address this, in the present embodiment, frame structure 121 is supported to be movable in parallel to the feeding direction of film 1 by two vertical guide shafts 101 placed parallel to the feeding direction of film 1. Frame structure 121 supported movably is moved in the vertical direction, for example by a frame structure driving mechanism such as a ball screw mechanism, to adjust the vertical position of frame structure 121. The ball screw mechanism has ball screw shaft 131 placed in the vertical direction, ball nut 132 fixed to frame structure 121 to screw ball screw shaft 131, and motor 133 capable of rotating ball screw shaft 131 by an arbitrary rotation number.

Figure 5:
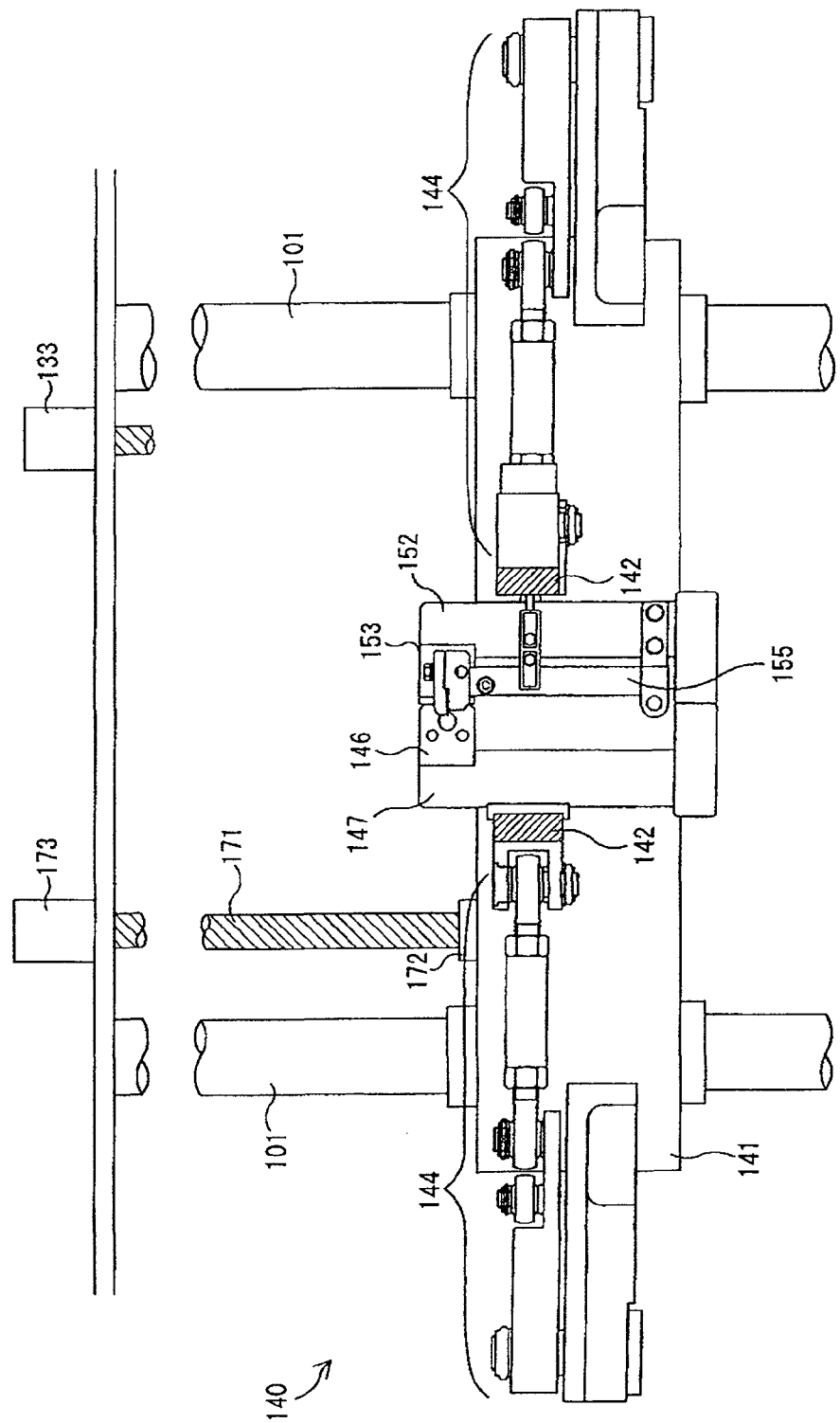
FIG. 5 is a side view showing, in section, a portion of a cooling/cutting unit of the horizontal seal mechanism shown in FIG. 1.
Figure 6:
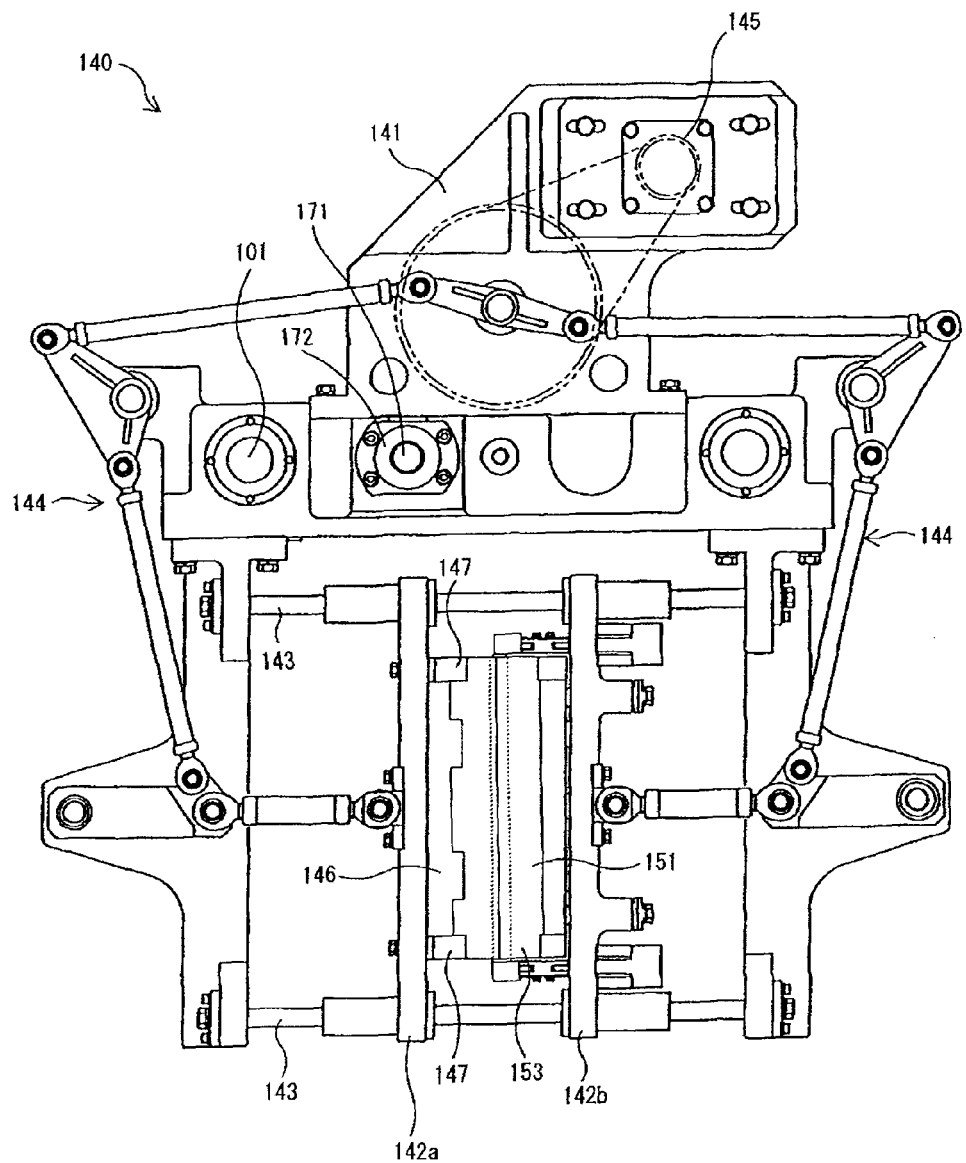
FIG. 6 is a plan view showing the cooling/cutting unit shown in FIG. 5.

Next, cooling/cutting unit 140 will be described with reference to FIGS. 5 and 6.

Cooling/cutting unit 140 has frame structure 141 which serves as a base for supporting components included in cooling/cutting unit 140. Frame structure 141 is placed under frame structure 121 (see FIG. 3) of heating unit 120. Frame structure 141 may be formed of a single member or may be formed of a combination of a plurality of members.

On frame structure 141, two sliders 142a and 142b placed opposite to each other are supported movably by two guide shafts 143 similarly to the frame structure of heating unit 120 and are movable opposite by toggle link mechanism 144 which is driven by servomotor 145. The mechanism for moving sliders 142a and 142b is not limited to toggle link mechanism 144 and an arbitrary mechanism may be used, as in heating unit 120.

First cooling bar 146 is supported by one slider 142a via two supports 147 placed under seal bars 125a and 125b (see FIGS. 3 and 4) and extending in the vertical direction. First cooling bar 146 extends parallel to seal bars 125a and 125b and have a length equal to that of seal bars 125a and 125b. Supports 147 support, on their top end portions, both end portions of first cooling bar 146.

A passage (not shown) through which cooling water flows is formed within first cooling bar 146. An inlet and an outlet of the passage are opened in first cooling bar 146. A supply tube (not shown) is connected to the inlet, and a discharge tube (not shown) is connected to the outlet. The cooling water is supplied into the passage from the supply tube, passes through the passage, and is discharged through the discharge tube. This cools first cooling bar 146. The cooling water is not necessarily at low temperature but may be at room temperature.

Figure 7A:
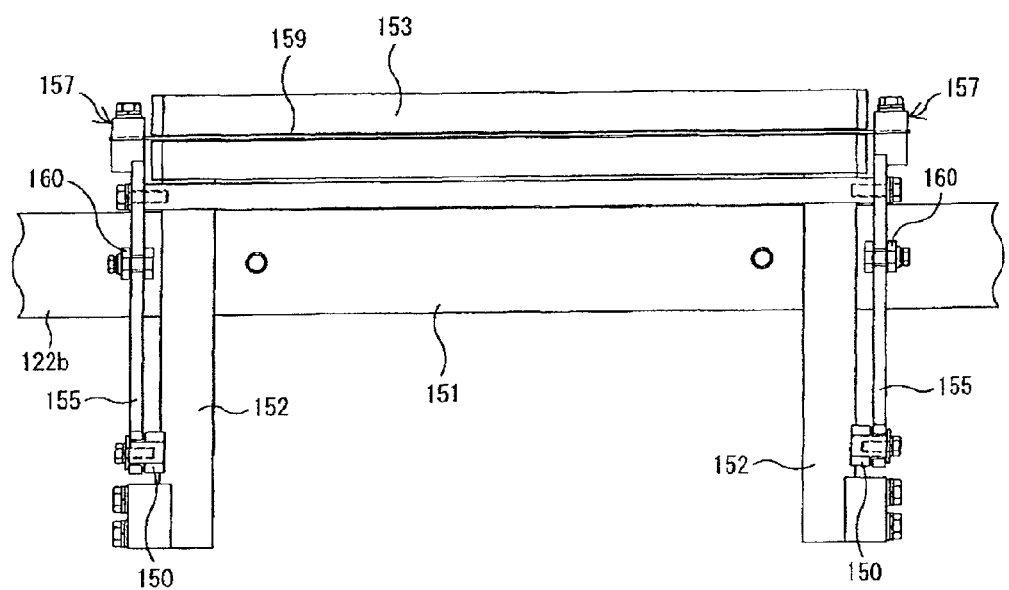
FIG. 7A is a diagram showing a cooling bar, a cutter, and a support structure thereof of the cooling/cutting unit when viewed from a pressurization surface of the cooling bar.
Figure 7B:
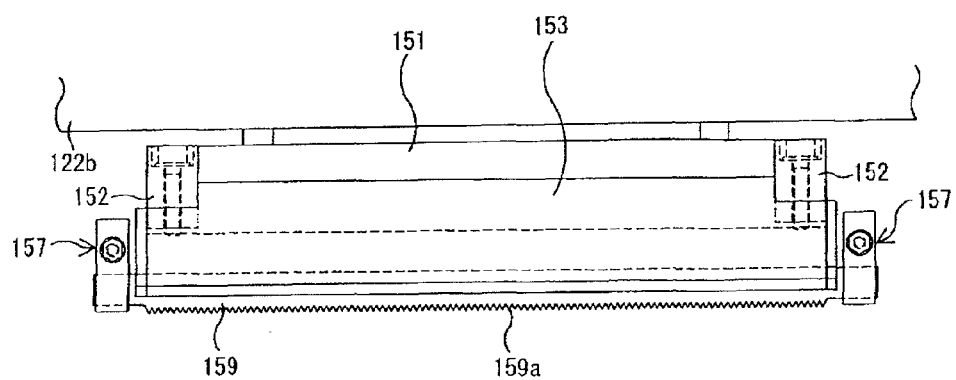
FIG. 7B is a plan view showing the cooling bar, the cutter, and the support structure thereof of the cooling/cutting unit.

Coupling bar 151 is attached to the other slider 142b. As shown in FIGS. 7A and 7B, coupling bar 151 extends parallel to slider 142b. Supports 152 placed under seal bars 125a and 125b and extending in the vertical direction are fixed to both end portions of coupling bar 151. Second cooling bar 153 is fixed to the top end portions of two supports 152. Second cooling bar 153 is supported, at both end portions thereof, by supports 152 to be parallel to first cooling bar 146 and opposite to first cooling bar 146 in the horizontal direction. As two sliders 142a and 142b are moved closer to each other, first cooling bar 146 and second cooling bar 153 press each other.

Coupling bar 151 is urged toward opposite slider 142a by a coil spring and is supported to be movable in parallel to the moving direction of slider 142b, similarly to seal bar 125b. The spring constant of the coil spring can be appropriately set to specify the pressurization force applied to film 1 in a proper range.

Figure 8A:
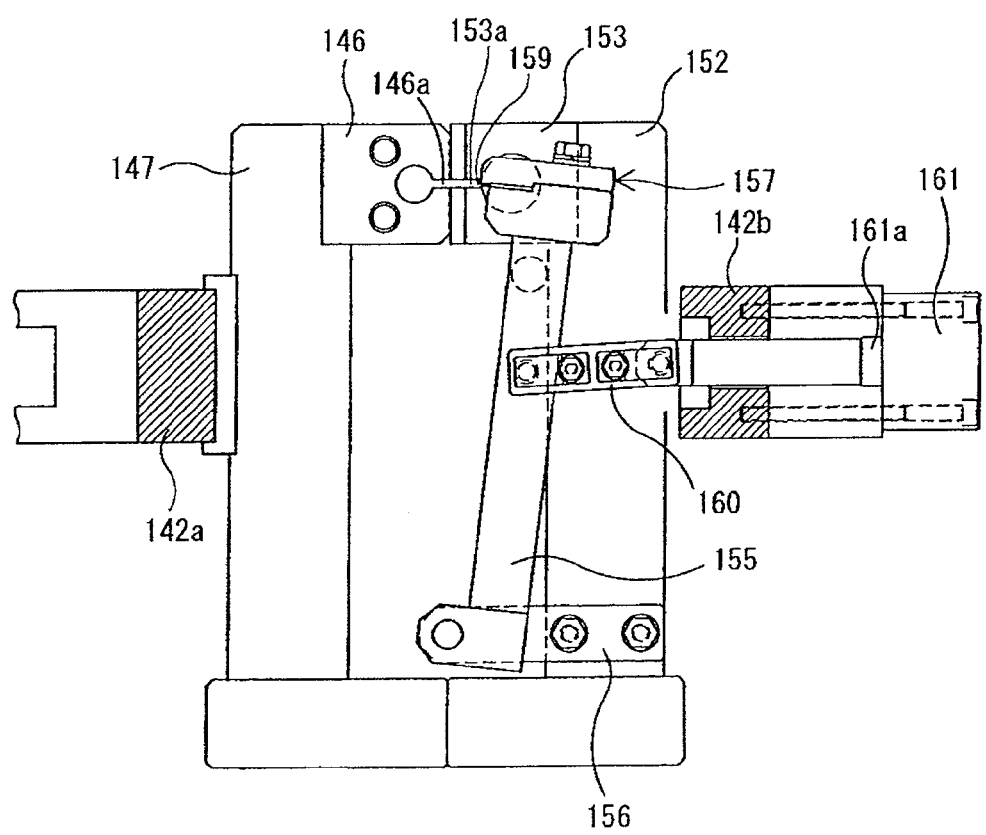
FIG. 8A is a side view showing main components of the cooling/cutting unit with a cutting blade withdrawn.
Figure 8B:
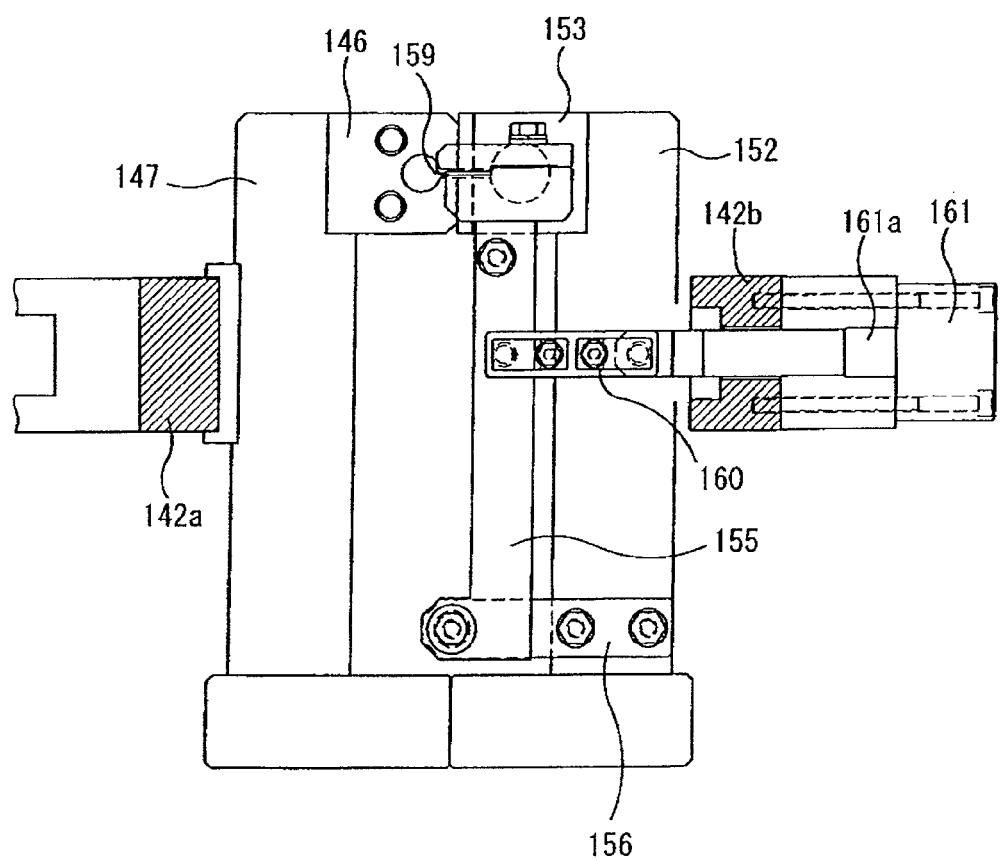
FIG. 8B is a side view showing the main components of the cooling/cutting unit with the cutting blade protruded.

As shown in FIGS. 7A, 8A, and 8B, on each of the bottom end portions of supports 152, movable lever 155 is supported swingably about an axis parallel to second cooling bar 153 via blanket 156 fixed on supports 152. Movable lever 155 extends upward from the center of the swing. Cutting blade holders 157 are attached to the respective top end portions of movable levers 155 such that holders 157 are placed on both sides of second cooling bar 153.

On the other hand, groove 153a (reference number thereof is shown only in FIG. 8A) is formed in second cooling bar 153 to be opened in the surface opposite to first cooling bar 146 such that groove 153a extends through second cooling bar 153 from one end to the other end thereof.

Cutting blade 159 extending parallel to second cooling bar 153 is disposed in groove 153a of second cooling bar 153. Cutting blade 159 has such a length that its both end portions protrude from both ends of second cooling bar 153. Cutting blade 159 is supported, at both end portions protruding from both ends of second cooling bar 153, by cutting blade holders 157.

Cutting blade 159 is moved from second cooling bar 153 toward first cooling bar 146 to cut film 1 sandwiched between first cooling bar 146 and second cooling bar 153 along the width direction of film 1. Thus, groove 153a of second cooling bar 153 is formed to have the dimensions and the shape in which cutting blade 159 can be moved. The edge of cutting blade 159 closer to first cooling bar 146 is formed in a sawtooth shape.

Cutting blade holder 157 has a first block fixed to movable levers 155 and a second block attached removably, for example by a bolt, to the top surface of the first block. Cutting blade 159 is sandwiched and held between the first block and the second block and can be replaced when the blade becomes dull.

Each of movable levers 155 is operated by cylinder 161 driven with a fluid pressure such as an air cylinder and a hydraulic cylinder. Cylinder 161 is fixed to slider 142b at a position opposite to each movable lever 155 across slider 142b with rod 161a faced toward movable lever 155. Rod 161a of cylinder 161 is coupled swingably about an axis parallel to second cooling bar 153 via coupling rod 160 to a portion of movable lever 155 between the center of the swing thereof and the portion thereof to which cutting blade holder 157 is attached.

When rod 161a of cylinder 161 is withdrawn, movable lever 155 is swung such that its top end portion is moved away from first cooling bar 146 as shown in FIG. 8A. This causes cutting blade 159 to be placed at a non-cutting position where it is housed in groove 153a of second cooling bar 153.

On the other hand, when rod 161a is protruded, movable lever 155 is swung such that its top end portion is moved toward first cooling bar 146 as shown in FIG. 8B. This causes cutting blade 159 to be moved to a cutting position where cutting edge 159a protrudes from groove 153a of second cooling bar 153. When cutting blade 159 is protruded with film 1 sandwiched between first cooling bar 146 and second cooling bar 153, film 1 is cut at the portion sandwiched between first cooling bar 146 and second cooling bar 153. To receive the portion of cutting blade 159 that protrudes from second cooling bar 153, first cooling bar 146 has groove 146a (reference number thereof is shown only in FIG. 8A) formed at a position opposite to groove 153a of second cooling bar 153 such that groove 146a is opened in the surface opposite to second cooling bar 153 and extends through first cooling bar 146 from one end to the other end thereof.

The example of movable lever 155 supported swingably is shown as the mechanism for operating cutting blade 159. However, the present invention is not limited thereto. Cutting blade 159 may be moved toward or away from second cooling bar 153 by supporting movable lever 155 to be parallel translatable. In addition, the driving source for moving movable lever 155 is not limited to cylinder 161 described above, and an arbitrary actuator may be used.

During the operation of filling and packaging machine 10 (see FIG. 1), cooling/cutting unit 140 is moved in the vertical direction. Thus, as shown in FIG. 6, frame structure 141 of cooling/cutting unit 140 is supported to be movable in the vertical direction by two vertical guide shafts 101 used also in heating unit 120 (see FIG. 4). Frame structure 141 is reciprocated in the vertical direction, for example, by a ball screw mechanism which has ball screw shaft 171 placed in the vertical direction, ball nut 172 fixed to frame structure 141 to screw ball screw shaft 171, and motor 173 capable of rotating ball screw shaft 171 by an arbitrary rotation number.

Figure 9:
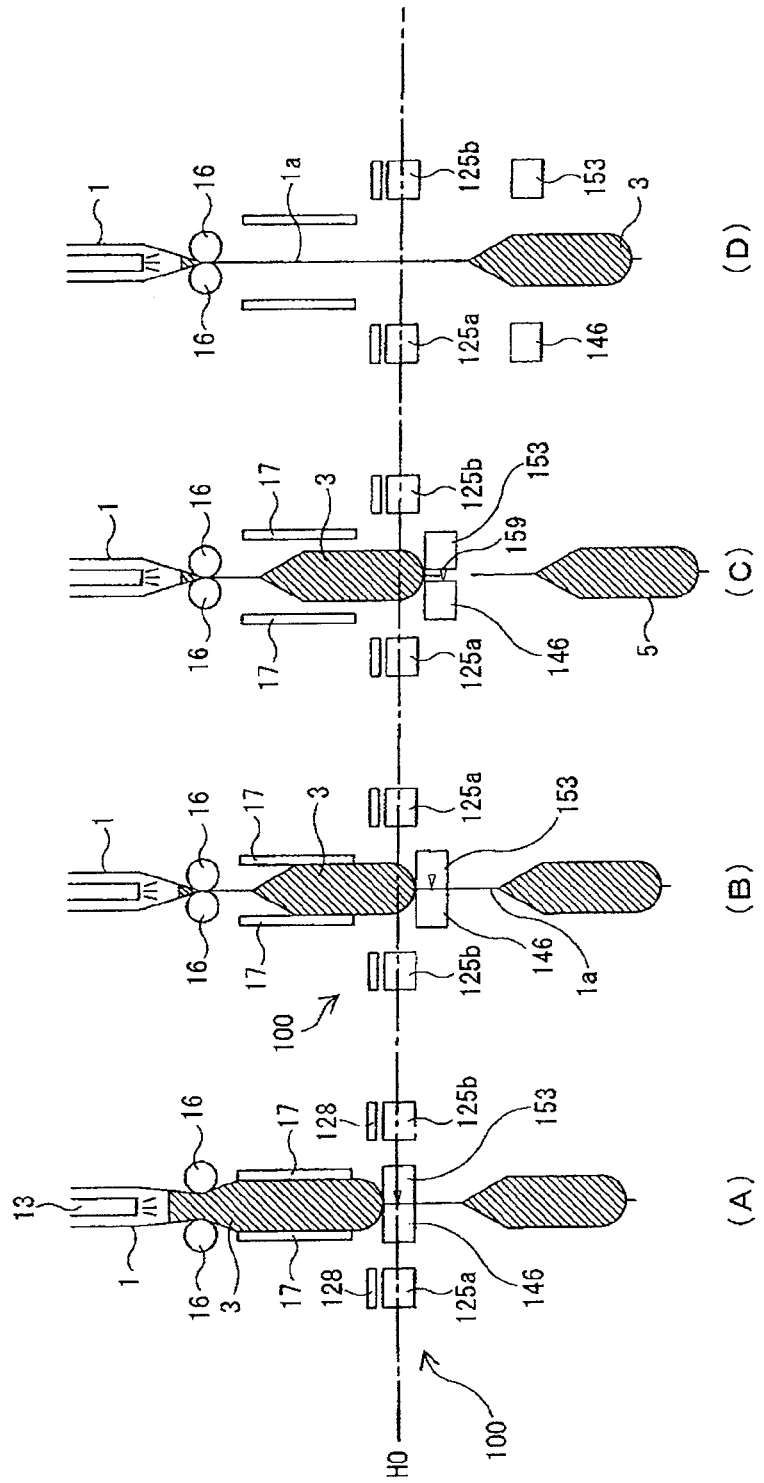
FIG. 9 is a schematic diagram showing a series of operations of the filling and packaging machine shown in FIGS. 1 and 2.
Figure 10:
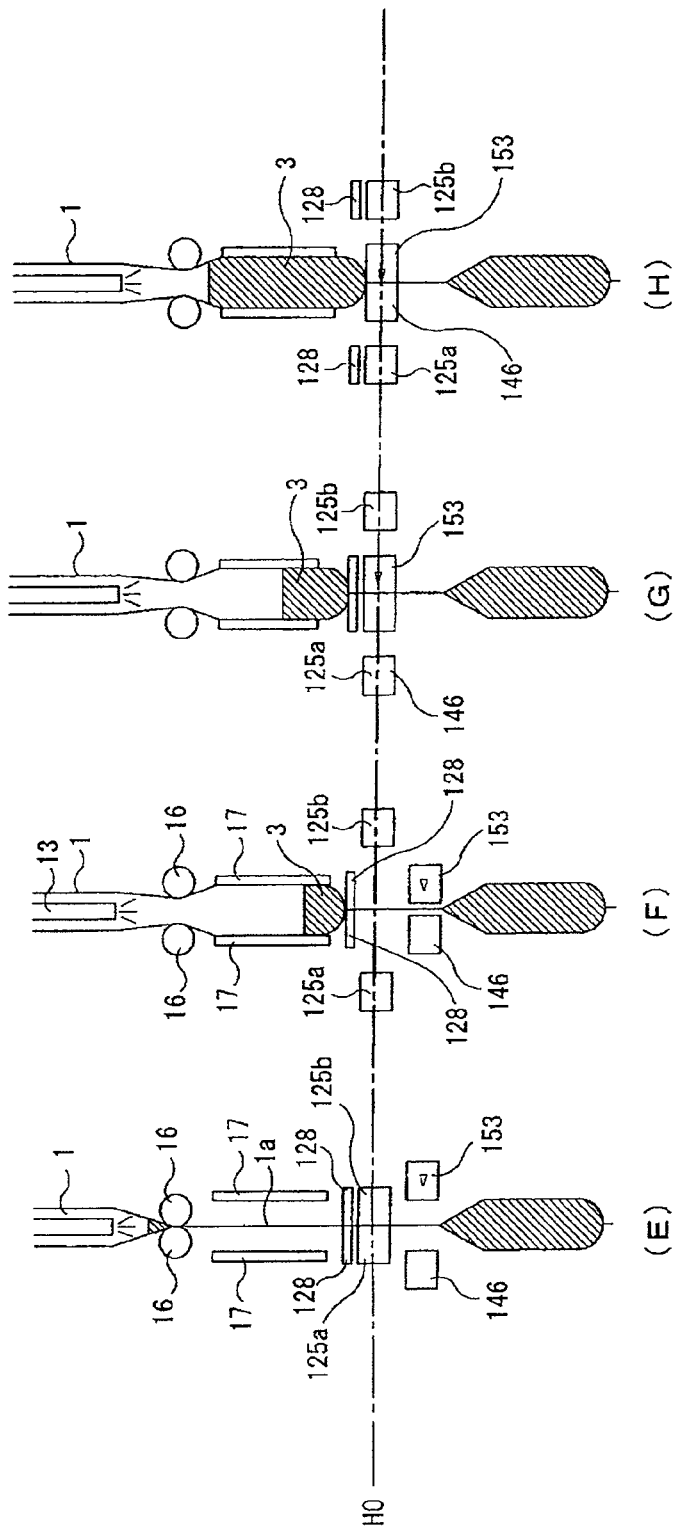
FIG. 10 is a schematic diagram showing the series of operations of the filling and packaging machine shown in FIGS. 1 and 2.

Next, the operation of filling and packaging machine 10 discussed above will be described with reference to FIGS. 9 and 10. FIG. 9 shows steps (A) to (D) of a series of steps described below. FIG. 10 shows steps (E) to (H) subsequent thereto.

At step (A) of FIG. 9, contents 3 are supplied into film 1 from supply pipe 13, and squeeze rollers 16 are opened. Shaping plates 17 are placed at a film holding position where plates 17 sandwich the portion of film 1 holding supplied contents 13 at a predetermined space interval under squeeze rollers 16 to prevent a bulge of film 1. Contents 3 are continuously supplied during the series of operations of filling and packaging machine 10.

In horizontal seal mechanism 100, film holders 128 and seal bars 125a and 125b are opened. First cooling bar 146 and second cooling bar 153 are placed at reference position H0 corresponding to the position of seal bars 125a and 125b in the vertical direction and are closed to sandwich the portion of film that was heat-seated in the preceding operation cycle. This cools the heat-sealed portion of film 1. The positions of first cooling bar 146 and second cooling bar 153 at step (A) also correspond to the positions of the upward movement limit thereof.

Next, at step (B) of FIG. 9, squeeze rollers 16 are closed. In this state, film 1 is fed downward by squeeze rollers 16 and auxiliary feed rollers 15 (see FIG. 2). At the time of the closing of squeeze rollers 16, the level of supplied contents 4 is above the position sandwiched by squeeze rollers 16. Thus, the closing of squeeze rollers 16 causes contents 3 to be divided into two portions above and below squeeze rollers 16. The division of contents 3 by squeeze rollers 16 can prevent containing of air into film 1 below squeeze rollers 16.

Film 1 is further fed downward in this state to form flat portion 1a holding no contents 3 therein in the portion of film that is squeezed by squeeze rollers 16. Since a bulge of film 1 is prevented by shaping plates 17 under squeeze rollers 16, contents 3 are separated in substantially equal amounts by squeeze rollers 16.

On the other hand, in horizontal seal mechanism 100, first cooling bar 146 and second cooling bar 153 are moved downward at a speed equal to the feeding speed of film 1. The movements of first cooling bar 146 and second cooling bar 153 are performed by moving whole cooling/cutting unit 140 (see FIG. 2) downward. During the downward feeding of film 1 at step (B), first cooling bar 146 and second cooling bar 153 continue sandwiching film 1, so that film 1 is continuously cooled by first cooling bar 146 and second cooling bar 153.

Next, at step (C) of FIG. 9, while film 1 is moved downward, that is, while cooling/cutting unit 14 is moved downward, cutting blade 159 is protruded from second cooling bar 153 toward first cooling bar 146. Thus, the portion of film 1 that was heat-sealed by seal bars 125a and 125b during the preceding operation cycle is cut along the width direction of film 1.

After film 1 is cut, cutting blade 159 is withdrawn into second cooling bar 153 and first cooling bar 146 and second cooling bar 153 are opened. At this point, the heat-sealed portion of film 1 has been solidified by first cooling bar 146 and second cooling bar 153. This results in package 5 corresponding to a part of film 1 under the cutting position and including contents 3 sealed in through the preceding operation cycle. Package 5 is dropped onto a transfer conveyor (not shown), carried to the next step, and is packed in a box, for example.

Film 1 is further fed downward after the cutting of film 1 by cutting blade 159. Then, as shown at step (D) of FIG. 9, the feeding of film 1 is stopped at the time when the top end of contents 3 separated by squeeze rollers 16 is positioned below the position of seal bars 125a and 125b. In other words, the time when the feeding of film 1 is stopped is the time when the bottom end portion of flat portion 1a formed in film 1 by squeeze rollers 16 is positioned between seal bars 125a and 125b. Squeeze rollers 16 remain closed during the feeding of film 1.

On the other hand, simultaneously with the feeding of film 1 from step (C) to step (D), first cooling bar 146 and second cooling bar 153 are further moved downward as they are separated farther so as to allow the portion of film holding supplied contents 3 to pass between first cooling bar 146 and second cooling bar 153. First cooling bar 146 and second cooling bar 153 are stopped at the positions of the downward movement limit.

After contents 3 are divided by squeeze rollers 16 at step (B), shaping plates 17 may be opened to move away from film 1 as shown at step (C). The movement of shaping plates 17 away from film 1 can prevent the friction between film 1 and shaping plates 17 during the downward feeding of film 1, so that film 1 can be fed stably and more quickly.

After the feeding of film 1 is stopped, at step (E) of FIG. 10, film holders 128 and seal bars 125a and 125b are closed. The closing of seal bars 125a and 125b causes the bottom end portion of flat portion 1a formed in film 1 to be pressurized and heated by seal bars 125a and 125b, and consequently, that portion is heat-sealed. Film holders 128 sandwich film 1 throughout the width thereof above the heat-sealed part of film 1. First cooling bar 146 and second cooling bar 153 start to move upward and toward each other in order to prepare for operations at the next step. Shaping plates 17 are also moved to the film holding position as in step (A) of FIG. 9 in order to prepare for the next step.

Next, as shown at step (F) of FIG. 10, seal bars 125a and 125b are opened. On the other hand, squeeze rollers 16 are opened. Since film holders 128 remain closed, the opening of squeeze rollers 16 causes contents 3 held above squeeze rollers 16 and contents 3 supplied from supply pipe 13 to be accumulated in film 1 above film holders 128.

Even when contents 3 are supplied into film 1 which was heat-sealed by seal bars 125a and 125b but not solidified yet, film holders 128 prevent the weight of supplied contents 3 from acting on the non-solidified portion of film 1. This eliminates the possibility of the non-solidified portion of film 1 being broken by the weight of contents 3, so that contents 3 can be supplied even before the portion of film 1 heated by seal bars 125a and 125b is solidified. Step (E) of FIG. 10 illustrates squeeze rollers 16 not opened yet. However, squeeze rollers 16 can be opened independently of the operation of seal bars 125a and 125b once film holders 128 are closed.

Next, as shown at step (G) of FIG. 10, first cooling bar 146 and second cooling bar 153 are moved upward to reference position H0 mentioned above, and film 1 is sandwiched between first cooling bar 146 and second cooling bar 153 at that position. This starts to cool the part of film 1 heat-sealed by seal bars 125a and 125b. Reference position H0 of first cooling bar 146 and second cooling bar 153 correspond to the upward movement end position of cooling/cutting unit 140, and cooling/cutting unit 140 moves upward and downward in a certain range during the operation of filling and packaging machine 10. Thus, the moving distance of cooling/cutting unit 140 is previously determined such that the upward movement end position corresponds to reference position H0.

Next, as shown at step (H) of FIG. 10, film holders 128 are opened. Even when film holders 128 are opened, the weight of contents 3 is not put on the heat-sealed portion of film 1 while the portion of film 1 heat-sealed by seal bars 125a and 125b is held by first cooling bar 146 and second cooling bar 153. For this reason, film holders 128 can be opened even before the heat-sealed portion of film is solidified.

Then, contents 3 continue to be supplied into film 1 and the abovementioned series of operations is repeated. As a result, packages 5 are successively produced.

As described above, according to the present embodiment, after film 1 is heat-sealed by heating unit 120 with the feeding of film 1 stopped, film 1 is not moved but cooling/cutting unit 140 is moved to sandwich the heat-sealed portion of film 1 between first cooling bar 146 and second cooling bar 153 of cooling/cutting unit 140. With film 1 sandwiched between first cooling bar 146 and second cooling bar 153, film 1 is fed downward and cooling/cutting unit 140 is moved downward, during which time film 1 is cut.

The heat-sealing position and the cutting position of film 1 greatly depend on the operation accuracy of heating unit 120 and cooling/cutting unit 140 rather than the feeding accuracy of film 1. The feeding accuracy of film 1 relates to the material, the size of film 1, and the type of contents 3, and is based on many uncertainties. On the other hand, as for heating unit 120 and cooling/cutting unit 140, the stable operation thereof can be achieved by enhancing the dimensional accuracy of the constituent components thereof.

Therefore, film 1 is heat-sealed by heating unit 120 and film 1 is held by cooling/cutting unit 140 while the feeding of film 1 is stopped, so that any displacement of the heat-sealing position from the cutting position can be eliminated substantially even when film 1 is cut as it is fed downward.

In the present embodiment, since cooling/cutting unit 140 can be moved in the vertical direction, the heat-sealed portion of film 1 can be cooled as film 1 is fed downward. This can shorten the time period in which the feeding operation of film 1 is stopped as compared with the conventional example. In addition, since heating unit 120 is not moved in the vertical direction during the operation of filling and packaging machine 10, it is possible to shorten the time period for switching from cooling/cutting unit 140 to heating unit 120 in the transition to the next heat-sealing step subsequent to the completion of the cooling/cutting step as compared with the case where heating unit 120 and cooling/cutting unit 140 are formed into a single unit. This can result in improvement in the manufacture efficiency of packages 5.

In addition, in the present embodiment, since heating unit 120 is not moved in the vertical direction during the operation of filling and packaging machine 10, heating unit 120 can be formed such that film holders 128 are provided above seal bars 125a and 125b. Film holders 128 thus provided allows the opening of squeeze rollers 16 during the heating of film 1 by seal bars 125a and 125b. Supplied contents 3 are dammed by closed film holders 128 and are not dropped further, so that seal bars 125a and 125b can heat-seal film 1 stably without being affected by contents 3. Consequently, the manufacture efficiency of packages 5 can be further improved.

As described above, the position of heating unit 120 in the vertical direction can be changed depending on the size of package 5 (specifically, the length of package 5) produced by filling and packaging machine 10. Next, the setting of the position of heating unit 120 for changing the length of package 5 will be described.

The length of package 5 produced by filling and packaging machine 10 depends on the distance from squeeze rollers 16 to seal bars 125a and 125b in the vertical direction. The distance from squeeze rollers 16 to seal bars 125a and 125b is increased by lowering heating unit 120 if an increased length of package 5 is desired, and the distance from squeeze rollers 16 to seal bars 125a and 125b is reduced by raising heating unit 120 if a reduced length of package 5 is desired.

The position setting of heating unit 120 is performed while the operation of filling and packaging machine 10 is stopped. For the position setting of heating unit 120, an operation panel (not shown) of filling and packaging machine 10 may be provided with a switch for setting the position of heating unit 120, for example. As an operator operates the switch for position setting with reference to the length of package 5 to be produced, motor 133 (see FIG. 3) is driven to change the position of heating unit 120 in the vertical direction. The change of the position of heating unit 120 changes reference position H0.

On the other hand, cooling/cutting unit 140 is moved upward and downward in a certain range during the operation of filling and packaging machine 10 in accordance with the abovementioned sequence. To allow the driving of cooling/cutting unit 140 without changing the abovementioned sequence, the initial position of cooling/cutting unit 140 is preferably changed to match the position of the upward movement end position of cooling/cutting unit 140 to the changed reference position H0. Specifically, the initial position of cooling/cutting unit 140 is changed such that the movement range of cooling/cutting unit 140 is shifted by the value equal to the changed value of the position of heating unit 120 in the vertical direction.

To change the initial position of cooling/cutting unit 140 readily in association with the position setting of heating unit 120, servomotors are preferably used as motor 133 for moving heating unit 120 upward and downward and motor 173 for moving cooling/cutting unit 140 upward and downward.

If each of motors 133 and 173 is a servomotor, and for example, the position of heating unit 120 is changed through the operation of the abovementioned switch for position setting, then the actual moving distance of heating unit 120 is detected from the number of the revolutions of motor 133. The data of the moving distance of heating unit 120 is transmitted to a controller for motor 173 for vertically moving cooling/cutting unit 140. The controller controls motor 173 based on the transmitted data, thereby moving cooling/cutting unit 140. As a result, the initial position of cooling/cutting unit 140 can be changed by the value equal to the changed value of heating unit 120, and accordingly, the movement range of cooling/cutting unit 140 is shifted.

After the positions of heating unit 120 and cooling/cutting unit 140 are changed in this manner, filling and packaging machine 10 can be operated. It is thus possible to produce package 5 having the changed length without causing any displacement of the heat-sealing position from the cutting position of film 1.

If the position setting of heating unit 120 is performed through the input of numeric values indicating the moving distance of heating unit 120, the input numeric values may be transmitted to both of a controller for motor 133 and the controller of motor 173 to allow the position change of cooling/cutting unit 140 and the position change of heating unit 120 at the same time.

The position changes of heating unit 120 and cooling/cutting unit 140 are performed prior to the operation of filling and packaging machine 10 in this example shown herein. However, film 1 may lengthen or shorten to cause displacement of the heat-sealing position during the operation of filling and packaging machine 10. If the position changes of heating unit 120 and cooling/cutting unit 140 can be performed during the operation of filling and packaging machine 10, fine adjustments can be made such as a correction of the displacement of the heat-sealing position due to the expansion or contraction of film 1. If the servomotors are not used as motors 133 and 173, similar effects to those described above can be achieved by providing each of motors 133 and 173 with an encoder which detects the number of revolutions of motors 133 and 173 and controlling the positions of heating unit 120 and cooling/cutting unit 140 based on the detection results of the encoders.

The present invention has been described with the representative embodiment. The present invention is not limited to the abovementioned embodiment, and various changes can be made within the scope of the technical idea of the present invention.

For example, the abovementioned embodiment has shown cooling/cutting unit 140 including cutting blade 159, but cutting blade 159 is not an essential component in the present invention. If cutting blade 159 is not provided, not only cutting blade 159 but also other components for supporting or driving cutting blade 159 such as cutting blade holder 157, movable levers 155, coupling rod 160, and cylinder 161 are omitted from cooling/cutting unit 140. Since cutting blade 159 is not provided, a plurality of packages 5 are produced in a connecting state. Connecting packages 5 can be separated one by one or in a plurality of packages by using a cutting apparatus (not shown) which is placed below horizontal seal apparatus 100 relative to the feeding direction of film 1 or is provided independently of filling and packaging machine 10.

The abovementioned embodiment has shown filling and packaging machine 10 including both of squeeze rollers 16 and film holder 128. However, they may not be necessarily provided, or only one of them may be provided.

The invention claimed is:

1. A filling and packaging machine for producing a package including contents held in a film while feeding the film from upward to downward, comprising:
  a supply pipe for supplying contents into the film formed in a tubular shape;
  a film feed mechanism for feeding the film from upward to downward, and
  a horizontal seal mechanism placed below the supply pipe in order to seal in contents supplied into the film,
  wherein the horizontal seal mechanism includes:
  a pair of seal bars adapted to be movable in the opposite direction to pressurize the film from sides in order to heat-seal the film;
  a pair of film holders placed between the supply pipe and the seal bars in the vertical direction to open or close to sandwich the film from the sides; and
  a pair of cooling bars adapted to be movable in the opposite direction to pressurize the film from the sides in order to cool a portion of the film heat-sealed by the seal bars, wherein each of the cooling bars is supported by an upper portion of a support member placed below the seal bars, extending in the vertical direction and being supported by a slider which moves in a direction in which the sliders are opposite to each other and in the vertical direction,
  wherein the seal bars are configured to repeat opening and closing at a reference position without moving in the vertical direction, and the cooling bars are configured to move upward to the reference position to sandwich the film between the opened seal bars at the reference position,
  wherein the seal bars and the film holders are supported by a first frame structure adapted to be position-adjustable in the vertical direction such that the seal bars and the film holders are movable opposite independently,
  wherein the film feed mechanism includes a pair of squeeze rollers placed between the supply pipe and the horizontal seal mechanism in a direction of the feeding of the film and squeezing the film from the sides thereof and rotating at the same time to form a flat portion in the film, and wherein the pair of seal bars are adapted to be movable in the vertical direction to change a distance from the pair of squeeze rollers to the pair of seal bars in the vertical direction depending on a size of the package, and a movement range of the pair of cooling bars in the vertical direction is shifted by a value equal to a changed value of the position of the pair of seal bars in the vertical direction.

2. The filling and packaging machine according to claim 1, wherein each of the cooling bars is supported by an upper portion of a support member, the support member being placed below the seal bars and extending in the vertical direction to be movable in a direction in which the support members are opposite to each other and in the vertical direction.

3. The filling and packaging machine according to claim 2, further comprising a cutting blade for cutting the film along a width direction thereof, wherein each of the cooling bars is provided with a groove, the grooves being opened in opposite surfaces at opposite positions of the cooling bars, and the cutting blade is supported in the groove of one of the cooling bars to be movable between a non-cutting position at which a cutting edge does not protrude from the groove and a cutting position at which the cutting edge protrudes from the groove.

4. The filling and packaging machine according to claim 3, further comprising:

a movable lever extending in the vertical direction, a lower portion of the movable lever being supported by the support member to be swingable about an axis parallel to the cooling bar;

a holder attached to an upper portion of the movable lever to hold the cutting blade; and lever driving means for operating the movable lever such that the cutting blade is moved between the non-cutting position and the cutting position.

5. The filling and packaging machine according to claim 1, wherein the support members are supported to be moveable by a second frame structure placed below the first frame structure to be moveable in the vertical direction.

6. The filling and packaging machine according to claim 1, further comprising a first servomotor for vertically moving of seal bars and a second servomotor for vertically moving the pair of cooling bars, wherein the position of the pair of seal bars in the vertical direction is changed in a state in which the operation of the filling and packaging machine is stopped, and the movement range of the pair of cooling bars in the vertical direction is shifted by controlling the second servomotor based on number of revolutions of the first servomotor.

7. A method of producing a package including contents held in a film while feeding the film from upward to downward, comprising the steps of:

using a film feed mechanism to supply contents into the film formed in a tubular shape by way of a supply pipe;

heat-sealing the film holding the supplied contents therein in a width direction thereof by a pair of seal bars adapted to be movable in the opposite direction to pressurize the film from sides and to repeat opening and closing at a reference position without moving in the vertical direction;

sandwiching a heat-sealed portion of the film from sides of the film by a pair of cooling bars adapted to move upward to the reference position to sandwich the film between the opened seal bars at the reference position while the feeding of the film remains stopped, wherein each of the cooling bars is supported by an upper portion of a support member placed below the seal bars, extending in the vertical direction and being supported by a slider which moves in a direction in which the sliders are opposite to each other and in the vertical direction;

sealing in the contents supplied into the film by moving the cooling bars sandwiching the film downward at the same speed as a feeding speed of the film to solidify the heat-sealed portion of the film while the film is fed downward; and sandwiching the film from the sides thereof by a pair of film holders placed above the seal bars and opposite to each other across a path through which the film passes, from the step of heat-sealing the film to the step of sandwiching the film by the cooling bars, wherein the seal bars and the film holders are supported by a first frame structure adapted to be position-adjustable in the vertical direction such that the seal bars and the film holders are movable opposite independently, wherein the film feed mechanism includes a pair of squeeze rollers placed between the supply pipe and the seal bars, cooling bars, or film holders in a direction of the feeding of the film and squeezing the film from the sides thereof and rotating at the same time to form a flat portion in the film, and wherein a pair of seal bars are adapted to be movable in the vertical direction to change a distance from the pair of squeeze rollers to the pair of seal bars in the vertical direction depending on a size of the package, and a movement range of the pair of cooling bars in the vertical direction is shifted by a value equal to a changed value of the position of the pair of seal bars in the vertical direction.

8. The method of producing a package according to claim 7, wherein the step of sealing in the contents includes cutting the film in the width direction in an area of the film sandwiched by the cooling bars.

* * * * *